(12) United States Patent
Wang (10) Patent No.: US 8,397,292 B2
(45) Date of Patent: Mar. 12, 2013

(54) METHOD AND DEVICE FOR ONLINE SECURE LOGGING-ON

(75) Inventor: Kai Wang, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 1106 days.

(21) Appl. No.: 12/348,215

(22) Filed: Jan. 2, 2009

(65) Prior Publication Data

US 2009/0177883 A1 Jul. 9, 2009

(30) Foreign Application Priority Data

Jan. 3, 2008 (CN) .......................... 2008 1 0055965

(51) Int. Cl.
*H04L 9/00* (2006.01)
(52) U.S. Cl. .............................. 726/22; 726/23; 713/187
(58) Field of Classification Search .................. 713/187; 726/22–24
See application file for complete search history.

(56) References Cited

U.S. PATENT DOCUMENTS 7,797,702 B1 * 9/2010 Ferrie ........................... 718/101
7,950,022 B1 * 5/2011 Gould et al. .................. 719/327

FOREIGN PATENT DOCUMENTS

WO WO 2007/137353 * 12/2007

* cited by examiner

*Primary Examiner* — Christopher Brown
(74) *Attorney, Agent, or Firm* — Kinney & Lange, P.A.

(57) ABSTRACT

The invention discloses a method for an online secure logging-on, comprises steps of: determining a correlation between at least one of processes and a logging-on operation; sorting the at least one of processes to two classes, that is, processes related to the logging-on operation and processes unrelated to the logging-on operation; running at least one of the processes related to the logging-on operation, when the logging-on operation is performed and a number of the processes related to the logging-on operation is one or more; and suspending at least one of the 1o processes unrelated to the logging-on operation, when the logging-on operation is performed and a number of the processes unrelated to the logging-on operation is one or more. The scheme of the present invention utilizes a real-time protection, needs less monitoring on the operating system and is easy to guarantee the stability. Since most processes of the operating system are suspended, the protection is more reliable. Corresponding to the method, the present invention also provides a device for an online secure logging-on.

10 Claims, 4 Drawing Sheets

METHOD AND DEVICE FOR ONLINE SECURE LOGGING-ON

BACKGROUND OF THE INVENTION

1. Field of Invention

The present invention relates to a field of network security, particularly to a method and a device for an online secure logging-on.

2. Description of Prior Art

With a development of a network, people are more and more dependent on various services based on the network, such as online shopping, online bank, online stock, online game, online friend making, Voice over IP (VoIP) and Instant Messenger (IM) communications etc. in their lives and works. How to protect security of user private information on the services is very important. The user privacy information includes an account, a password, and online registration information (such as a home telephone number, an address and an identification number etc.).

However, there are severe threats on security of the current network. Malicious codes, such as virus, Trojan and worm etc, emerge in endlessly, wherein Trojan has the greatest harm. Trojan has functions of a very strong concealment and a powerful network communications. Trojan is a program running on a computer, which generally consists of two parts, i.e. a client program and a server program. The server program is a program running on a controlled computer, which is generally small and hidden, and exists in a form of virus. When the computer is booted, the program may be enabled automatically. If there is no dedicated software for searching and killing viruses or no careful analysis, the program is hard to be found and killed. The client program is a program installed on a machine used by a controlling partner, which is generally made as a graphical interface. Thus, the machine installing the server program (or, so-called a machine being implanted by Trojan) may be manipulated on the machine installing the client program, e.g. to view a screen of a counterpart, obtain files of the counterpart and stole a password of the counterpart etc. Anyway, Trojan may achieve any of functions which may be implemented by programs, which is a so-called remote control, i.e. to control one machine with another machine.

Currently, there are various solutions for Trojan virus. Each of the solutions has its own advantages and disadvantages, which are analyzed as follows:

1. Use of Antivirus Software

Antivirus software is a method of defending Trojan which is widely used currently. Antivirus software corporations collect various samples of Trojan viruses, extract lo signature from the samples to form a virus database. The antivirus software scans for Trojan virus in a system based on the virus database, and delete the Trojan virus.

Although a technique for antivirus software is relatively mature, signature based scanning is a main technical solution for the technique. There exists some defects. Firstly, updating the virus database is of hysteresis. It takes a period of time during which samples of a Trojan are analyzed and signature are extracted so as to update the virus database, after the Trojan is spread out and captured by the antivirus software corporation. Therefore, it is difficult for the antivirus software to search and kill a new Trojan timely. Secondly, the antivirus software generally can not prevent intrusion of the Trojan effectively, and it is only a measure for remedy ex post facto. Even if the antivirus software may find the Trojan existing in the system and delete it, it may be possible that the Trojan has already stolen information such as an account and a password of a user, and then such a loss which has been caused could not be remedied even if the Trojan is cleared. Finally, current Trojans already have relatively mature approaches, such as packing, modifying signature mutually, polymorphism and variation, etc, to avoid signature scanning from the antivirus software, so that various mainstream antivirus software may not achieve an ideal effect to search and kill the Trojans.

2. Use of Host Intrusion Prevent System (HIPS)

For defects in the signature scanning technique, HIPS begins to catch more and more attentions. HIPS may monitor the operating system in the round, and filter program behaviors in a predetermined rule. All of operations which are not authorized may be intercepted. Contents to be monitored include a file operation, a procedure operation and a registry operation etc, especially some typical behaviors of Trojan viruses such as loading global hook, remote thread rejection, API HOOK and adding an autorun item in the registry etc.

HIPS has a better protection effect, but it also has obvious defects. Firstly, the use lo of HIPS is complex. The difficulty for applying HIPS is how to set the rule. Setting the rule needs the user not only to know the computer system much deeply, but also familiar with features of Trojan, virus etc. If the rule is set unreasonable, it is possible to achieve a non-ideal protection effect or affect a normal running of the system, which limit the application scope of HIPS greatly. Secondly, the performance, stability and compatibility of HIPS are not ideal, since HIPS works in a kernel mode of the system and monitors a great amount of API functions. Thus, a high resource occupancy rate may be caused, the stability of the system may be reduced, and it is possible to have a collision with other software.

3. Use of Dedicated Password Protection Software

The principle of the dedicated password protection software is similar with HIPS, which is to monitor some critical API functions, and protect a designated process. Such a product includes a 360 safe box and an account safe box etc.

This kind of password protection software generally focuses on some specific software, such as on-line bank and on-line game etc. It has greater advantages than HIPS in its stability and easy usage. However, such software may have a defense ability which is not strong enough so as to be passed by easily, since its monitoring is not in the round. For example, 360 safe box has executed Inline Hook on several functions in the core, and the protection will be invalid as long as Trojan loads a driver into the core to recover the Hook.

4. Use of Digital Certificate

The digital certificate is a protection scheme generally used in the current on-line bank. The user applies the bank for a digital certificate, and must submit the digital certificate simultaneously when he logs on his account. The digital certificate may be stored in the hard disk as a file, or in a dedicated hardware.

The digital certificate may guarantee security of the logging-on effectively. However, it is difficult to be spread and used widely, since applying and managing the certificate may be troublesome and costly, which cause a limited occasion to be used.

SUMMARY OF THE INVENTION

Accordingly, a main object of the present invention is to provide a method and a device for an online secure logging-on, so as to solve problems such as hysteresis and a complex setting existing in the prior art.

Therefore, an embodiment of the present invention provides a technical solution as follows:

A method for an online secure logging-on, comprises steps of:

determining a correlation between at least one of processes and a logging-on operation;

sorting the at least one of processes to two classes, that is, processes related to the logging-on operation and processes unrelated to the logging-on operation;

running at least one of the processes related to the logging-on operation, when the logging-on operation is performed and a number of the processes related to the logging-on operation is one or more; and suspending at least one of the processes unrelated to the logging-on operation, when the logging-on operation is performed and a number of the processes unrelated to the logging-on operation is one or more.

The method further comprises steps of:

monitoring the processes related to the logging-on operation; and determining whether the processes launch remote threads or not; and if so, suspending the threads.

The method further comprises steps of:

making further analyzing on the remote threads; and suspending the threads, only if a result of the analysis indicates that the threads are dangerous.

The step of analyzing comprises in detail:

determining whether the threads register in an operating system or not, checking a file signature, or judging whether the threads have hiding behaviors.

The step of sorting the processes comprises steps of:

determining that all of kernel mode drivers are related to the logging-on operation, and user mode processes are unrelated to the logging-on operation; or determining that critical kernel mode drivers are related to the logging-on operation, and remaining kernel mode drivers and user mode processes are unrelated to the logging-on operation; or determining that all of the kernel mode drivers are related to the logging-on operation, and the user mode processes and the kernel mode drivers are unrelated to the logging-on operation; or determining that the critical kernel mode drivers are related to the logging-on operation, and remaining user mode user mode processes and kernel mode drivers are unrelated to the logging-on operation.

The method further comprises a step of:

recovering processes and threads which have been suspended, when the user finishes his logging-on.

A device for an online secure logging-on, comprises:

a determination unit for determining a correlation between at least one of processes and a logging-on operation;

a sorting unit for sorting the at least one of processes to two classes, that is, processes related to the logging-on operation and processes unrelated to the logging-on operation;

an operation unit for running at least one of the processes related to the logging-on operation, when the logging-on operation is performed and a number of the processes related to the logging-on operation is one or more; and suspending at least one of the processes unrelated to the logging-on operation, when the logging-on operation is performed and a number of the processes unrelated to the logging-on operation is one or more.

The device further comprises:

a white list for preserving processes related to the logging-on operation;

a monitoring unit for monitoring the white list to determine doubtable threads;

a secure analysis unit for performing a secure analysis on the doubtable threads determined by the monitoring unit, in order to determine whether the doubtable threads are dangerous threads; and a black list for preserving the dangerous threads determined by the secure analysis unit;

wherein the operation unit is further used for suspending the threads in the black list.

A method for an online secure logging-on, comprises steps of:

determining a correlation between at least one of threads and a logging-on operation;

sorting the at least one of threads to two classes, that is, threads related to the logging-on operation and threads unrelated to the logging-on operation;

running at least one of the threads related to the logging-on operation, when the logging-on operation is performed and a number of the threads related to the logging-on operation is one or more; and suspending at least one of the threads unrelated to the logging-on operation, when the logging-on operation is performed and a number of the threads unrelated to the logging-on operation is one or more.

The step of sorting the threads comprises steps of:

determining that all of kernel mode drivers are related to the logging-on operation, and user mode threads are unrelated to the logging-on operation; or determining that critical kernel mode threads are related to the logging-on operation, and remaining kernel mode threads and user mode threads are unrelated to the logging-on operation; or determining that all of the kernel mode threads are related to the logging-on operation, and all of the user mode threads are unrelated to the logging-on operation; or determining that the critical kernel mode threads are related to the logging-on operation, and remaining kernel mode threads, user mode threads and kernel mode drivers are unrelated to the logging-on operation.

The method further comprises a step of:

recovering threads which have been suspended, when the user finishes his logging-on.

A device for an online secure logging-on, comprises:

a determination unit for determining a correlation between at least one of threads and a logging-on operation;

a sorting unit for sorting the at least one of threads to two classes, that is, threads related to the logging-on operation and threads unrelated to the logging-on operation;

to an operation unit for running at least one of the threads related to the logging-on operation, when the logging-on operation is performed and a number of the threads related to the logging-on operation is one or more; and suspending at least one of the threads unrelated to the logging-on operation, when the logging-on operation is performed and a number of the threads unrelated to the logging-on operation is one or more.

Technical effects of the above technical solutions are analyzed as follows:

The technical solution of the present invention may defend user mode Trojan effectively. The Trojan running in the user mode can not perform behaviors such as stealing the password in any way when it is suspended. The technical solution may also have better defending effect for kernel mode Trojan. That is because there is basically no Trojan which is implemented purely in drivers currently. Using drivers by Trojan is mainly for hiding and protecting user mode programs, or capturing keystroke, which needs to be cooperated with the user mode process. Once the user mode process is suspended, Trojan basically can not implement stealing tasks.

Compared with the antivirus software, the scheme of the present invention utilizes a real-time protection without any hysteresis, which may avoid loss of key information such as passwords etc. Compared with HIPS, the scheme does not need a great amount of interactions with the user and is easily used. Also the scheme needs less monitoring on the operating system and is easy to guarantee the stability. Compared with the dedicated password protection software, the protection is more reliable, since most threads of the operating system are suspended. Compared with the digital certificate, the scheme may be implemented in software, which has a good universality, low cost and convenient usage.

DETAILED DESCRIPTION OF PREFERRED EMBODIMENTS

The main idea of the present invention is to freeze instantly. That is to say, when a user uses some network services (e.g. logging on an on-line bank), most of processes are suspended, and only necessary processes are kept, so as to provide the user with a secure executive environment.

Figure 1:
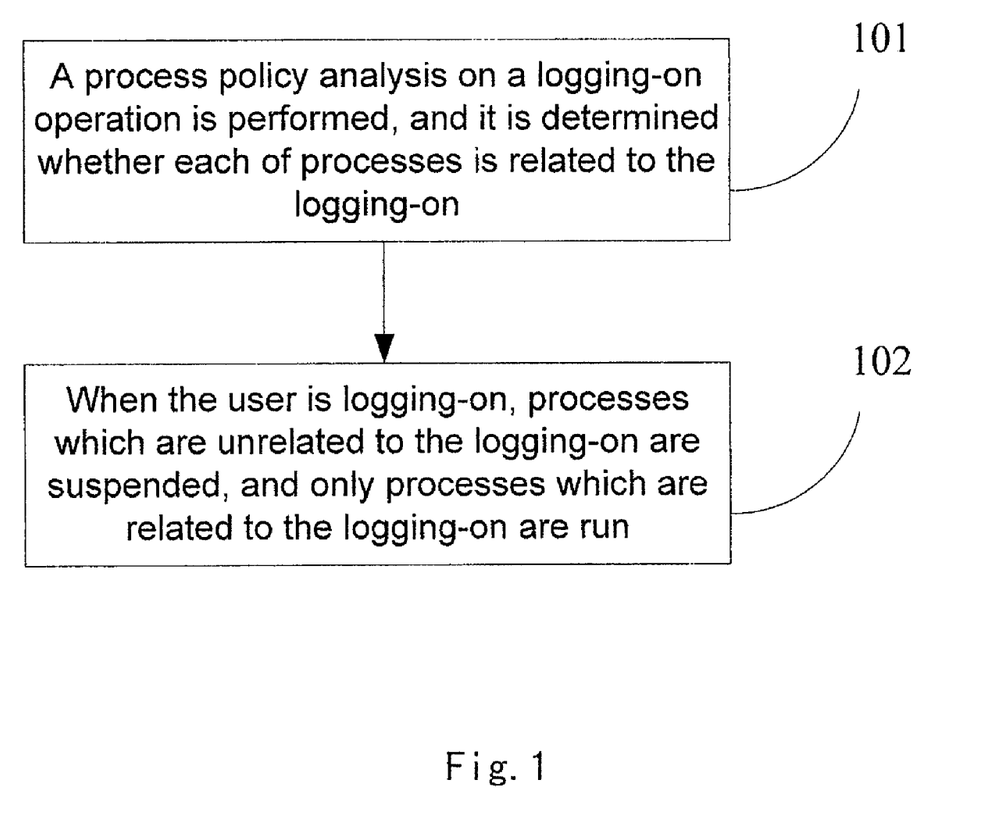
FIG. 1 is a flowchart of a first method embodiment according to the present invention.

As shown in FIG. 1, FIG. 1 is a flowchart of a first method embodiment according to the present invention, comprising:

step 101 of performing a policy analysis on a logging-on operation, and determining whether each of processes is related to the logging-on;

step 102 of suspending processes which are unrelated to the logging-on and running only processes which are related to the logging-on, when the user is logging-on.

In particular, the first method embodiment comprises steps of:

determining a correlation between at least one of processes and the logging-on operation;

sorting the at least one of processes to two classes, that is, processes related to the logging-on operation and processes unrelated to the logging-on operation;

running at least one of the processes related to the logging-on operation, when the logging-on operation is performed and a number of the processes related to the logging-on operation is one or more; and suspending at least one of the processes unrelated to the logging-on operation, when the logging-on operation is performed and a number of the processes unrelated to the logging-on operation is one or more.

The policy analysis may have various schemes, which is mainly used for analyzing the processes which are unrelated to the user logging-on process and suspending them, in order to provide a secure executive environment for the network services.

Policy 1: all of kernel mode processes-programs are allowed to run and most of user mode processes-programs are suspended.

For example, the kernel mode processes-programs which are allowed to be run include user-enabled process such as system, local service, network service, and operating system-enabled processes such as explorer.exe. The user mode processes-programs are suspended.

Such a policy may guarantee stability of the system, system deadlock may not easily happen, and the user's logging-on operation generally may not be affected.

Policy 2: only a small amount of necessary critical kernel mode processes-programs are allowed to run, and remaining processes-programs are suspended.

For example, the processes which are allowed to be run include system, smss, csrss, winlogon and svchost etc, while remaining kernel mode processes-programs and user mode processes-programs are suspended. Thus, the security of the policy 2 is improved compared with that of the policy 1.

Policy 3: based on the policies 1 and 2, not only the user mode processes-programs are suspended, but also doubtable drivers running in the kernel are suspended and temporarily unloaded.

Many of drivers for the operating system may be unloaded dynamically. Thus, such drivers may be unloaded temporarily and stopped. If the driver itself can not support the dynamic unloading, it may be suspended forcibly. Such a policy may provide a higher security.

The above three policies have their own advantages and disadvantages, and may be select as required in practical operations.

The technical solution of the present invention may defend user mode Trojan effectively. The Trojan running in the user mode can not perform behaviors such as stealing the password in any way when it is suspended. The technical solution may also have better defending effect for kernel mode Trojan. That is because there is basically no Trojan which only has kernel mode part currently. The kernel mode part of Trojan is mainly for hiding and protecting user mode parts, or capturing keystroke, which needs to be cooperated with the user mode parts. Once the user mode parts is suspended, Trojan basically can not implement stealing tasks.

Compared with the antivirus software, the scheme of the present invention utilizes a real-time protection without any hysteresis, which may avoid loss of key information such as passwords etc. Compared with HIPS, the scheme does not need a great amount of interactions with the user and is easily used. Also the scheme needs less monitoring on the operating system and is easy to guarantee the stability. Compared with the dedicated password protection software, the protection is more reliable, since most threads of the operating system are suspended. Compared with the digital certificate, the scheme may be implemented in software, which has a good universality, low cost and convenient usage.

Figure 2:
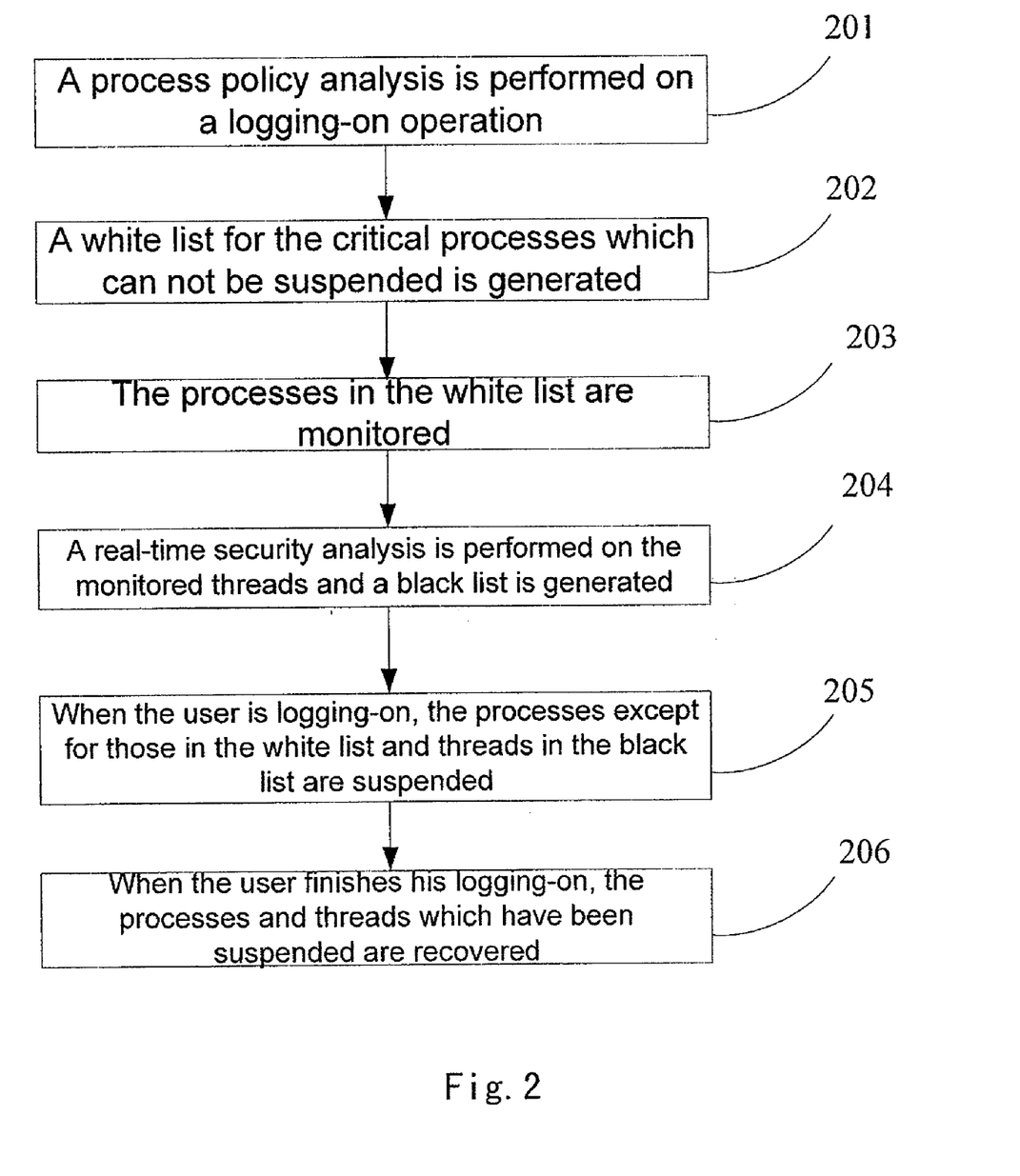
FIG. 2 is a flowchart of a second method embodiment according to the present invention.

As seen from FIG. 2, FIG. 2 is a flowchart of a second method embodiment according to the present invention. Compared with the first embodiment, the second embodiment incorporates steps of making further analyzing on running processes; determining whether there are doubtable threads or not; performing a suspension operation on the doubtable threads, so as to prevent Trojan from attacking a local computer via a remote thread and to further improve logging-on security of the user.

The second embodiment comprises steps of:

step 201 of performing a process-policy analysis on a logging-on operation; and determining which processes are critical processes which can not be suspended based on the operating system environment and the requirements of the processes to be protected (detailed policy may refer to the first embodiment);

step 202 of generating a white list for the critical processes which can not be suspended;

wherein the processes "which may not be frozen", such as several critical service programs for the operating system, are recorded in the white list mentioned in the scheme;

step 203 of monitoring the processes in the white list; in particular, monitoring whether the processes in the white list launch the remote threads; and if so, determining they are doubtable threads;

The main purpose of monitoring is to prevent the Trojan from entering kernel mode of trustable process in a way of remote thread injection. Currently, the method of system monitoring is relatively mature, which is mainly to hook to several critical API functions in Windows system, and monitor establishment of threads in the system. Generally, the API functions needed to be hooked include NtOpenThread, NtOpenProcess, NtCreatThread, NtCreatProcess, NtTerminate and NtTerminateProcess etc.

Taking CreatRemoteThread function which is generally used by the Trojan as an example, this function may enable the remote thread in other process spaces. Since general applications seldom enable the remote thread, once the operating system monitors that there is a program to invoke the function, such a program may be listed as a doubtable thread. The CreatRemoteThread function invokes Windows Native API NtCreatThread. Thus, it is only needed to monitor NtCreatThread, in order to find the remote thread in the system.

step 204 of performing a real-time security analysis on the doubtable threads in the monitoring records, determining which threads in the white list are dangerous threads, and generating a black list;

Only the system monitoring may not sufficient to remove dangerous threads. Preferably, an analysis on the monitoring records is also needed. Since the system monitoring performs the analysis on invoking the API function and all of the normal applications are possible to invoke the API function, if no analysis is performed on the monitoring result, a misstatement may be generated.

Taking a message hook as an example, the Trojan generally uses a global message hook in process, but normal applications also often use such a technique (such as a function of capture a word automatically in Kingsoft Dictionary). Thus, an analysis may be needed.

There may be various analysis approaches, including checking a file signature, determining whether to register in the system, determining whether there is a behavior of hiding itself etc. Probability of the misstatement may be greatly reduced by analyses from various aspects.

Detailed examples for detecting the hiding behavior are as follows.

1. CreateToolhelp32Snapshot and Process32First search for all of threads in the system;

2. Native API ZwQuerySystemInformation is invoked to query all of the system processes;

3. Two searching results (e.g. Kingsoft Dictionary) are compared, and both of the two searching results may have "Kingsoft Dictionary". If it is Trojan, its existence may not be found in step 1.

step 205 of suspending these processes except for those in the white list and threads in the black list;

The implementation of suspension for its user mode processes and threads is easy. There are generally processes suspension and thread suspension functions in the operating system. Take Windows as an example, most of the user mode processes and threads may be suspended by using ZwSuspendProcess and ZwSuspendThread, or NtSuspendProcess and NtSuspendThread.

The kernel mode threads are required to be suspended in the kernel mode. For example, suspension of the kernel mode threads may be implemented by using Asynchronous Procedure Call (APC).

step 206 of recovering the processes and threads which have been suspended, when the user finishes his logging-on.

Recovering the suspension of the user mode processes and threads is relatively easy. There are generally process suspension recovery and thread suspension recovery functions in the operating system. Take Windows as an example, most of the suspended user mode processes and threads may be recovered by using ZwResumeProcess and ZwResumeThread, or NtResumeProcess and NtResumeThread.

Compared with the first embodiment, the second embodiment may further guarantee security when the user is logging-on. That is to say, for the Trojan with the remote thread injection, it is also easy to find out and suspend the injected thread.

Taking some user logging on a China Merchants Bank professional web-page as an example, the second embodiment is illustrated as described below.

1. Information on critical processes which can not be suspended in the operating system is obtained by analyzing all of processes in the operating system, and those critical processes are added to a process white list together with protected China Merchants Bank professional client processes;

2. After the operating system is started up, it monitors the processes in the white list immediately; once it is found that there are other processes enabling remote threads in these processes, information on these remote threads are recorded; threads with security hidden troubles in these remote threads are found by analyzing, and added to a thread black list;

3. When the user opens the China Merchants Bank professional client to log on, firstly the process white list is inquired, and all of processes except for processes in the white list are suspended; then the thread black list is queried, and threads in the black list are suspended; at this time, the user may obtain a secure network service environment temporarily, and performs operations such as inputting his account and password;

4. When the user finishes the logging-on, all of suspended processes and threads are recovered to run, so as not to affect other operations of the operating system.

In particular, it may be implemented by a suspension recovery function such as ZwResumeProcess, ZwResumeThread, NtResumeProcess or NtResumeThread.

It should be noted that the scheme of the present invention may be used in connection with the current schemes such as antivirus software, HIPS and dedicated password protection software. In this way, the user may be provided with more secure network service environment.

Figure 3:
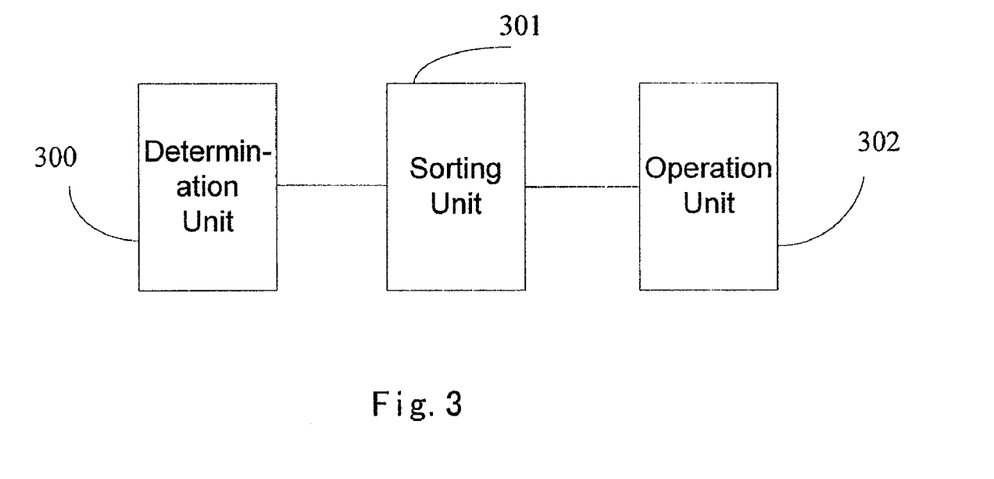
FIG. 3 is a schematic diagram of a first device embodiment according to the present invention.

Corresponding to the above first method embodiment, the structure schematic diagram of the first device embodiment provided by the present invention is seen from FIG. 3. The device of the present invention is preferably implemented in software, which has a good universality, low cost and is easy to be transplanted. Of course, the device of the present invention may also be implemented in hardware or in a combination of software and hardware.

As seen from FIG. 3, the first device embodiment only includes a determination unit 300 for determining a correlation between at least one of processes and a logging-on operation; a sorting unit 301 for sorting the at least one of processes to two classes, that is, processes related to the logging-on operation and processes unrelated to the logging-on operation; an operation unit 302 for running at least one of the processes related to the logging-on operation, when the logging-on operation is performed and a number of the processes related to the logging-on operation is one or more; and suspending at least one of the processes unrelated to the logging-on operation, when the logging-on operation is performed and a number of the processes unrelated to the logging-on operation is one or more. Detailed policies for sorting the processes may include, as described in the first method embodiment, Policy 1 in which all of kernel mode processes are allowed to run and most of user mode processes are suspended; Policy 2 in which only a small amount of necessary critical processes are allowed to run, and remaining processes are suspended; and Policy 3 based on the policies 1 and 2, in which not only the user mode processes are suspended, but also doubtable drivers running in the core are suspended and temporarily unloaded. In practical implementations, an appropriate policy may be selected from the three policies according to the environment in which the operating system runs and requirements for network service security. The detailed implementation for the first device embodiment may refer to the first method embodiment, and the description thereof will be omitted.

Figure 4:
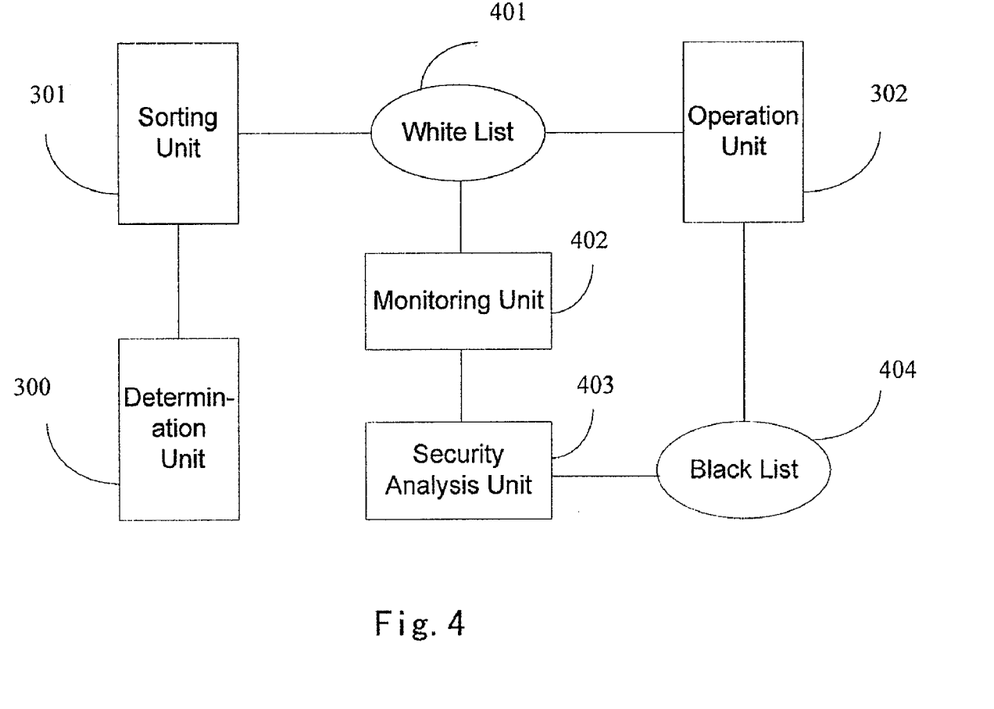
FIG. 4 is a schematic diagram of a second device embodiment according to the present invention.

FIG. 4 is a schematic diagram of a second device embodiment according to the present invention. Based on FIG. 3, the second device embodiment further comprises a white list 401, a monitoring unit 402, a security analysis unit 403, and a black list. Moreover, functions of the operation unit 302 are improved.

The white list 401 is mainly responsible for preserving processes related to the logging-on which are analyzed by the policy analysis engine 301.

The monitoring unit 402 is mainly responsible for monitoring the processes in the white list 401 and determining doubtable threads.

The security analysis unit 403 is mainly responsible for performing a security analysis on the doubtable threads determined by the monitoring unit 402; and determining whether they are dangerous threads or not.

The black list 404 is mainly responsible for preserving the dangerous threads determined by the security analysis unit 403.

The operation unit 302 hot only suspends processes which are unrelated to the logging-on, but also suspends the threads in the black list 404.

Some detailed implementations for the second device embodiment may refer to the second method embodiment, Furthermore, due to relationships between the processes and threads, the embodiments of the present invention may also be implemented by performing a policy analysis on the threads instead of performing a policy analysis on the processes. It should be known by the skilled in the art that the threads are entities in the processes, one process may have a number of threads, and one thread must have one parent process. Thus, the embodiments of the present invention may be implemented by monitoring and suspending the threads directly.

In summary, a method for an online secure logging-on, comprises steps of:
determining a correlation between at least one of threads and a logging-on operation;
sorting the at least one of threads to two classes of threads, that is, threads related to the logging-on operation and threads unrelated to the logging-on operation;
running at least one of the threads related to the logging-on operation, when the logging-on operation is performed and a number of the threads related to the logging-on operation is one or more; and
suspending at least one of the threads unrelated to the logging-on operation, when the logging-on operation is performed and a number of the threads unrelated to the logging-on operation is one or more.

Figure 5:
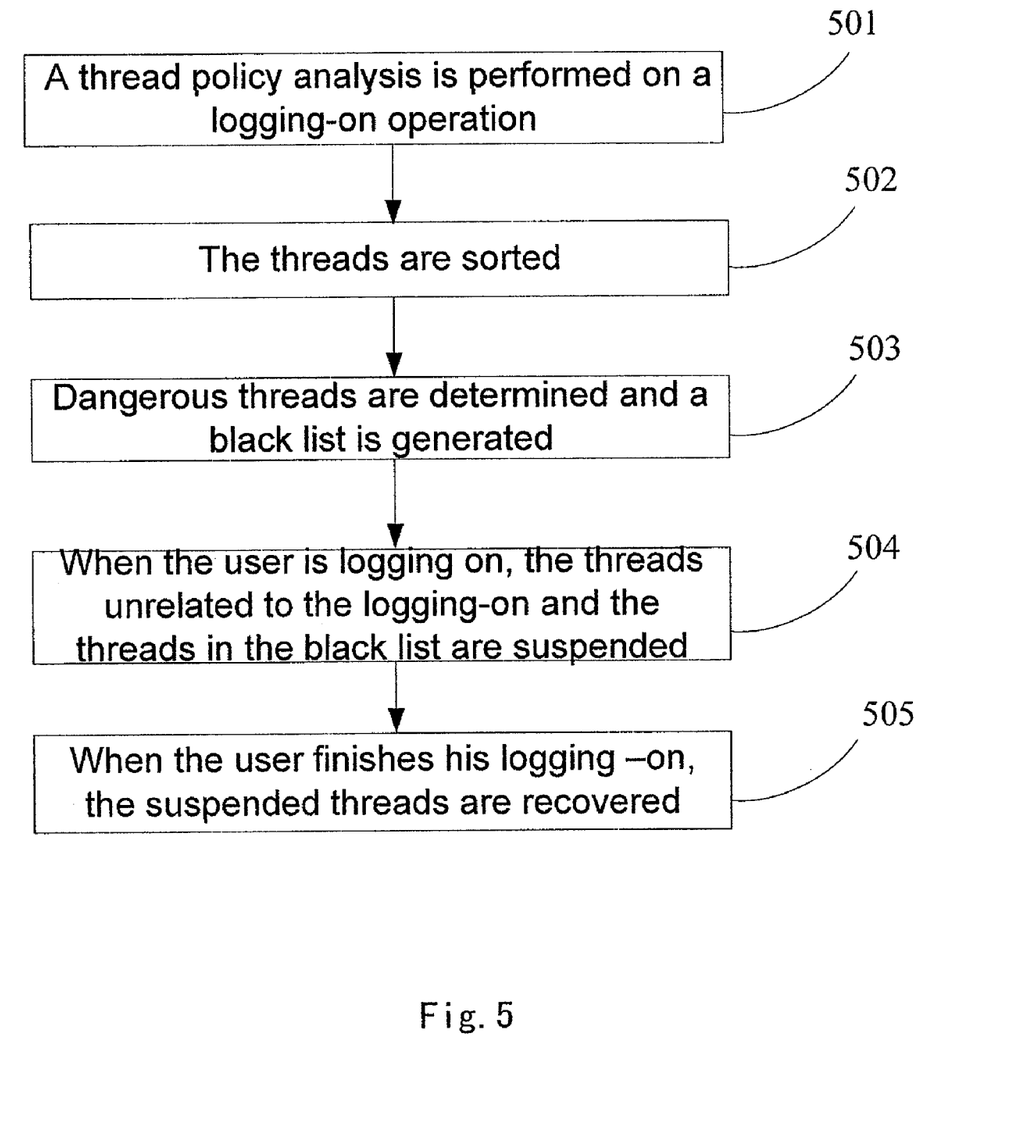
FIG. 5 is a method flowchart of monitoring and suspending the threads according to the present invention.

FIG. 5 is a method flowchart of monitoring and suspending the threads according to the present invention, comprising:
step 501 of performing a thread policy analysis on a logging-on operation;
step 502 of sorting the threads to two classes, that is, threads related to the logging-on operation and threads unrelated to the logging-on operation;
step 503 of determining which threads are dangerous threads and generating a black list;
step 504 of suspending the threads unrelated to the logging-on and the threads in the blank list, when the user is logging on; and
step 505 of recovering the suspended threads when the user finishes his logging-on.

In step 501, it is determined which threads are critical threads unable to be suspended according to the environment of the operating system and requirements for the protected threads. The process of sorting the threads comprises steps of: determining that all of kernel mode threads are related to the logging-on operation, and user mode threads are unrelated to the logging-on operation; or determining that critical kernel mode threads are related to the logging-on operation, and remaining kernel mode threads and user mode threads are unrelated to the logging-on operation; or determining that all of the kernel mode threads are related to the logging-on operation, and the user mode threads and the kernel mode drivers are unrelated to the logging-on operation; or determining that the critical kernel mode threads are related to the logging-on operation, and remaining kernel mode threads, user mode threads and kernel mode drivers are unrelated to the logging-on operation. Detailed thread policy may refer to the first method embodiment.

The embodiment of the present invention provides a device for an online secure logging-on, which is corresponding to the method embodiment of the present invention implemented by threads. The device comprises: a determination unit for determining a correlation between at least one of threads and a logging-on operation; a sorting unit for sorting the at least one of threads to two classes of threads, that is, threads related to the logging-on operation and threads unrelated to the logging-on operation; an operation unit for running at least one of the threads related to the logging-on operation, when the logging-on operation is performed and a number of the threads related to the logging-on operation is one or more; and suspending at least one of the threads unrelated to the logging-on operation, when the logging-on operation is performed and a number of the threads unrelated to the logging-on operation is one or more.

The above is only the preferred embodiments of the present invention and the present invention is not limited to the above embodiments. Therefore, any modifications, substitutions and improvements to the present invention are possible without departing from the spirit and scope of the present invention.

What is claimed is:

1. A method for an online secure logging-on utilizing a computer, comprising steps of:
   determining a correlation between at least one of processes and a logging-on operation;
   sorting the at least one of processes into two classes, that is, processes related to the logging-on operation and processes unrelated to the logging-on operation;

running at least one of the processes related to the logging-on operation, when the logging-on operation is performed and a number of the processes related to the logging-on operation is one or more; and suspending at least one of the processes unrelated to the logging-on operation, when the logging-on operation is performed and a number of the processes unrelated to the logging-on operation is one or more, wherein the step of sorting the processes comprises steps of:

determining that all kernel mode processes are related to the logging-on operation, and user mode processes are unrelated to the logging-on operation; or determining that critical kernel mode processes are related to the logging-on operation, and remaining kernel mode processes and user mode processes are unrelated to the logging-on operation; or determining that all kernel model processes are related to the logging-on operation, and user mode processes and kernel mode drivers are unrelated to the logging-on operation; or determining that critical kernel mode processes are related to the logging-on operation, and remaining kernel model processes, user mode processes and kernel model drivers are unrelated to the logging-on operation.

2. The method according to claim 1, further comprising steps of:

monitoring the processes related to the logging-on operation; and determining whether the processes launch remote threads or not; and if so suspending the threads.

3. The method according to claim 2, further comprising steps of:

making a further analyzing on the remote threads; and suspending the threads, only if a result of the analysis indicates that the threads are dangerous.

4. The method according to claim 3, wherein the step of analyzing comprises in detail:

determining whether the threads register in an operating system or not, checking a file signature, or judging whether the threads have hiding behaviors.

5. The method according to claim 1, further comprising a step of:

recovering processes and threads which have been suspended, when the user finishes his logging-on.

6. A device including a computer processor for an online secure logging-on, comprising:

a determination unit for determining a correlation between at least one of processes and a logging-on operation;

a sorting unit for sorting the at least one of processes to two classes, that is, processes related to the logging-on operation and processes unrelated to the logging-on operation;

an operation unit for running at least one of the processes related to the logging-on operation, when the logging-on operation is performed and a number of the processes related to the logging-on operation is one or more; and suspending at least one of the processes unrelated to the logging-on operation, when the logging-on operation is performed and a number of the processes unrelated to the logging-on operation is one or more, wherein the sorting unit is further configured to:

determine that all kernel mode processes are related to the logging-on operation, and user mode processes are unrelated to the logging-on operation; or determine that critical kernel model processes are related to the logging-on operation, and remaining kernel mode processes and user mode processes are unrelated to the logging-on operation; or determine that all kernel mode processes are related to the logging-on operation, and user mode processes and kernel mode drivers are unrelated to the logging-on operation; or determine that critical kernel mode processes are related to the logging-on operation, and remaining kernel mode processes, user mode processes and kernel mode drivers are unrelated to the logging-on operation.

7. The device according to claim 6, further comprising:

a white list for preserving processes related to the logging-on operation;

a monitoring unit for monitoring the white list to determine doubtable threads;

a secure analysis unit for performing a secure analysis on the doubtable threads determined by the monitoring unit, so as to determine whether the doubtable threads are dangerous threads; and a black list for preserving the dangerous threads determined by the secure analysis unit;

wherein the operation unit is further used for suspending the threads in the black list.

8. A method for an online secure logging-on utilizing a computer, comprising steps of:

determining a correlation between at least one of threads and a logging-on operation;

sorting the at least one of threads to two classes, that is, threads related to the logging-on operation and threads unrelated to the logging-on operation;

running at least one of the threads unrelated to the logging-on operation, when the logging-on operation is performed and a number of the threads related to the logging-on operation is one or more; and suspending at least one of the threads unrelated to the logging-on operation, when the logging-on operation is performed and a number of the threads unrelated to the logging-on operation is one or more, wherein the step of sorting the threads comprises steps of:

determining that all kernel mode threads are related to the logging-on operation, and user mode threads are unrelated to the logging-on operation; or determining that critical kernel mode threads are related to the logging-on operation, and remaining kernel mode threads and user mode threads are unrelated to the logging-on operation; or determining that all kernel mode threads are related to the logging-on operation, and user mode threads and kernel mode drivers are unrelated to the logging-on operation; or determining that critical kernel mode threads are related to the logging-on operation, and remaining kernel mode threads, user mode threads and kernel mode drivers are unrelated to the logging-on operation.

9. The method according to claim 8, further comprising a step of:

recovering threads which have been suspended, when the user finishes his logging-on.

10. A device including a computer processor for an online secure logging-on, comprising:

a determination unit for determining a correlation between at least one of threads and a logging-on operation;

a sorting unit for sorting the at least one of threads into two classes, that is, threads related to the logging-on operation and threads unrelated to the logging-on operation; and an operation unit for running at least one of the threads related to the logging-on operation, when the logging-on operation is performed and a number of the threads related to the logging-on operation is one or more; and suspending at least one of the threads unrelated to the logging-on operation, when the logging-on operation is performed and a number of the threads unrelated to the logging-on operation is one or more, wherein the sorting unit is further configured to:
  determine that all kernel mode threads are related to the logging-on operation, and user mode threads are unrelated to the logging-on operation; or
  determine that critical kernel model threads are related to the logging-on operation, and remaining kernel mode threads and user mode threads are unrelated to the logging-on operation; or
  determine that all kernel mode threads are related to the logging-on operation, and user mode threads and kernel mode drivers are unrelated to the logging-on operation; or
  determine that critical kernel mode threads are related to the logging-on operation, and remaining kernel mode threads, user mode threads and kernel mode drivers are unrelated to the logging-on operation.

* * * * *

UNITED STATES PATENT AND TRADEMARK OFFICE
CERTIFICATE OF CORRECTION

| | | |
|---|---|---|
| PATENT NO. | : 8,397,292 B2 | Page 1 of 1 |
| APPLICATION NO. | : 12/348215 | |
| DATED | : March 12, 2013 | |
| INVENTOR(S) | : Kai Wang | |

It is certified that error appears in the above-identified patent and that said Letters Patent is hereby corrected as shown below:

In the Specification

Col. 1, Line 50
 Delete "lo" after "extract"

Col. 2, Line 20
 Delete "lo" after "the use"

Col. 9, Line 42
 Delete "hot"
 Insert --not--

Signed and Sealed this
Eleventh Day of February, 2014

Michelle K. Lee
*Deputy Director of the United States Patent and Trademark Office*